(12) United States Patent
Andre et al.

(10) Patent No.: US 6,585,191 B2
(45) Date of Patent: Jul. 1, 2003

(54) AIR INLET COWL FOR A JET ENGINE, PROVIDED WITH DEICING MEANS

(75) Inventors: Robert Andre, Auzeville Tolosane (FR); Alain Porte, Colomiers (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/103,716

(22) Filed: Mar. 25, 2002

(65) Prior Publication Data
US 2002/0148929 A1 Oct. 17, 2002

(30) Foreign Application Priority Data
Apr. 17, 2001 (FR) .............................. 01 05194

(51) Int. Cl.⁷ .............................................. B64D 15/04
(52) U.S. Cl. .................................................. 244/134 B
(58) Field of Search ........................ 244/53 B, 134 B, 244/134 R, 207; 60/39.093

(56) References Cited

U.S. PATENT DOCUMENTS

| | | |
|---|---|---|
| 2,636,666 A | 4/1953 | Lombard |
| 4,688,745 A | 8/1987 | Rosenthal Herman A. |
| 4,738,416 A * | 4/1988 | Birbragher .............. 244/134 B |
| 4,757,963 A | 7/1988 | Cole |
| 5,400,984 A | 3/1995 | Arnold et al. |
| 6,196,500 B1 * | 3/2001 | Al-Khalil et al. ....... 244/134 R |
| 6,241,189 B1 | 6/2001 | Porte |
| 6,427,434 B2 * | 8/2002 | Porte et al. ............. 244/134 B |

FOREIGN PATENT DOCUMENTS

EP 0918149 5/1999

* cited by examiner

Primary Examiner—Galen L. Barefoot

(57) ABSTRACT

An air inlet cowl for a jet engine, particularly an aeroengine, includes a leading edge deicer, a hollow leading edge defining an internal peripheral chamber, closed by a first internal partition, and an exhaust orifice, in the leading edge, connecting the internal chamber with the outside. The cowl further includes a pressurized hot air feedpipe for being connected, at its rear end away from the leading edge and passing through a second internal partition, to a pressurized hot air circuit and, at its front end toward the leading edge, to an injector of pressurized hot air into the internal chamber, a protective internal casing functioning with the first and second internal partitions to define an isolation volume enclosing the feedpipe, and an air extraction opening, in the first partition, to place the isolation volume in communication with the internal peripheral chamber. The area of this extraction opening is such that, in the event of damage to the feedpipe, the elimination of pressurized hot air in the isolation volume does not impair the protective internal casing and the injector injects into the internal chamber a pressurized hot air flow rate at least equal to 50% of the hot air flow rate in the feedpipe.

8 Claims, 5 Drawing Sheets

AIR INLET COWL FOR A JET ENGINE, PROVIDED WITH DEICING MEANS

BACKGROUND OF THE INVENTION

The present invention relates to the deicing of the air inlet cowls of jet engines, particularly aeroengines.

It is known that, if need be (to prevent ice from forming or to eliminate ice which has already formed), the leading edge of the air inlet cowl of such engines is deiced by heating it using pressurized hot air tapped off said engine and conveyed to said leading edge by a hot air circulation circuit. This pressurized hot air, tapped off the engine, is at a high temperature, for example of the order of 400° C., which means that said pipe radiates heat and that the structures surrounding said air inlet cowl which are sensitive to heat (for example the acoustic panels made of composite) need to be protected against the heat. What is more, for obvious safety reasons, it is also necessary to protect said surrounding structures against the event of leaking pressurized hot air or bursting of said pipe.

DESCRIPTION OF THE PRIOR ART AND SUMMARY OF THE INVENTION

To this end, document U.S. Pat. No. 6,241,189 discloses an air inlet cowl for a jet engine, particularly an aeroengine, said air inlet cowl being provided with means for deicing its leading edge, and comprising for this purpose:

- a hollow leading edge delimiting an internal peripheral chamber, closed by a first internal partition, and provided with at least one exhaust orifice placing said internal chamber in communication with the outside;
- a hot air feedpipe capable of being connected, at its rear end away from said leading edge and passing through a second internal partition, to a pressurized hot air circuit and, at its front end toward said leading edge, to an injector injecting said pressurized hot air into said internal chamber;
- a protective internal casing collaborating with said first and second internal partitions to delimit an isolation volume enclosing said feedpipe;
- at least one opening for introducing air into said volume; and
- at least one opening for extracting air from said volume.

Thus, in this known air inlet cowl, said pipe, with its connections and flanges, is isolated from the remainder of the inside of the air inlet cowl and said (continuous and integral) protective internal casing affords protection to the surrounding structures against thermal radiation and pressurized hot air leaks, and against the effects of said pipe bursting. By virtue of the openings for introducing and extracting air there is obtained, in normal operation, permanent internal ventilation of the isolation volume, and this limits the radiation of heat from the feedpipe, the heat-sensitive surrounding structures thus finding themselves protected from any damage or ageing associated with exposure to high temperatures. In the event of leaks, bursting or explosion of the pipe, the hot air is evacuated to the outside through the extraction opening, so that, here again, said surrounding structures are protected against the pressurized hot air.

This known air inlet cowl therefore perfectly performs its functions of protecting said surrounding structures from heat. However, it must be observed that, in the event of damage to the feedpipe, the pressurized hot air is immediately and in its entirety sent to the outside via said extraction opening, the cross section of which is, incidentally, calibrated to avoid the overpressure resulting from the bursting of said pipe being detrimental to the protective internal casing. Thus, this hot air is not only wasted to no effect and, on escaping, generates an increase in drag, but also ceases to be fed into the injector and the internal peripheral chamber, which means that deicing of the leading edge of said cowl can no longer be provided. It is therefore no longer possible for the pilot to take steps to prevent the formation of ice or to eliminate a layer of ice which has already formed, with all the risks that that entails, such as damage to the engine by ingestion of pieces of ice, for example.

It may readily be observed that the air inlet cowl described in document U.S. Pat. No. 4,757,963 has the same drawbacks.

It is the object of the present invention to overcome these drawbacks and to provide satisfactory deicing of said leading edge of the air inlet cowl, even in the event of serious damage to said hot air feedpipe.

To this end, according to the invention, the air inlet cowl for a jet engine, particularly for an aeroengine, said air inlet cowl being provided with means for deicing its leading edge, comprises:

- a hollow leading edge delimiting an internal peripheral chamber, closed by a first internal partition;
- at least one exhaust orifice placing said internal chamber in communication with the outside and made in said hollow leading edge;
- a pressurized hot air feedpipe capable of being connected, at its rear end away from said leading edge and passing through a second internal partition, to a pressurized hot air circuit and, at its front end toward said leading edge, to an injector injecting said pressurized hot air into said internal chamber of the leading edge;
- a protective internal casing collaborating with said first and second internal partitions to delimit an isolation volume enclosing said feedpipe; and
- an air extraction opening made in said first partition to place said isolation volume enclosing said feedpipe in communication with said internal peripheral chamber of said leading edge, the cross-sectional area of this extraction opening being chosen from a range of values such that, in the event of damage to said hot air feedpipe:
  - the elimination of pressurized hot air in said isolation volume is not detrimental to said protective internal casing; and
  - the injector injects into said internal chamber a pressurized hot air flow rate at least equal to 50% of the hot air flow rate in said feedpipe.

Thus, in the event of damage to said feedpipe, the pressurized hot air spreads out in said isolation volume and passes into said peripheral chamber of the leading edge through said air extraction opening. Because of the special calibration, according to the present invention, of said air extraction opening, on the one hand, the overpressure resulting from the bursting of said pipe cannot damage the walls of said isolation volume and, on the other hand, the pressure therein increases to become at most equal to the hot air pressure inside said feedpipe. The result of this is that, at the zone where the feedpipe is leaking, the pressure in said isolation volume acts as an imaginary bung virtually plugging said leaking zone and confining the pressurized hot air, tapped off the engine, in the feedpipe. Said hot air therefore continues, at least in part, to feed the injector, which allows satisfactory deicing of the leading edge of the air inlet cowl. The hot air which has circulated through said peripheral chamber of the leading edge and has cooled down on contact with the walls thereof is then removed to the open air, without excessive pressure drop, to said exhaust orifice with which said leading edge is provided.

In addition, the stream of hot air passing through the extraction opening mixes with the stream of hot air injected by the injector and is carried along by the latter, which allows the former to play a part in deicing the leading edge of the air inlet cowl.

Of course, in normal operation, when said hot air feedpipe is neither burst nor leaking said extraction opening made in the first partition exhibits no disadvantage, it merely placing two hot enclosed areas, namely the isolation volume and the peripheral chamber of the leading edge, in communication.

It will be noted that document U.S. Pat. No. 5,400,984 describes an air inlet cowl for an aircraft jet engine which, on the face of it, seems similar to that of the present invention. It will, however, be noted that, in the latter document:

said air extraction opening allows free, wholly unimpeded, gaseous communication, between said isolation volume and the hollow leading edge; and in addition, the orifice placing the internal chamber of the hollow leading edge in communication with the outside is made not in the leading edge but rather in the skin structure of the rear compartment, an elbowed pipe providing the communication between said internal chamber and said orifice.

Now, it is delusional to think that an extraction opening such as the one provided by U.S. Pat. No. 5,400,984, can be used to replace the injector in the event of said feedpipe bursting. What actually happens in that case is that the pressurized hot air from the burst feedpipe and filling said isolation volume immediately expands as it passes into said peripheral chamber of the leading edge through said extraction opening and loses its kinetic energy. All it can then do is to spread out in a zone close to said extraction opening, without being able to circulate throughout the internal peripheral chamber of the leading edge. The result of this then is that the zones of this chamber which are distant from the extraction opening remain subjected to relatively low temperatures, whereas those situated in the vicinity of said extraction opening are raised to very high temperatures. It is therefore impossible, under these conditions, to obtain satisfactory deicing of the leading edge. This detrimental effect is further amplified by the significant pressure drop introduced by said elbowed pipe.

In contrast, in the leading edge cowl according to the present invention, the exhaust orifice is made directly in the hollow leading edge, which reduces to a minimum the pressure drop of the stream of hot air exhausted to the outside and, in the event of damage, the injector continues to be useable, in spite of the bursting of the feedpipe. As a result, injected to the peripheral chamber of the leading edge is a stream of pressurized hot air which starts to circulate in this chamber and, at every moment, the stream of pressurized hot air being injected mixes with the stream of air already circulating therein. Thus, by virtue of the present invention, the temperature of the air stream in said peripheral chamber can be evened out and satisfactory deicing can be obtained, even in the part of the cowl away from said injector.

To further improve the effect of the stream of hot air passing through said extraction opening being carried along by the stream of hot air injected by the injector, it is advantageous to provide, inside said internal peripheral chamber of the leading edge, a deflector capable of deflecting the hot air passing through said extraction opening in the same direction as the hot air injected by said injector.

Thus, the hot air which has passed through said opening does not expand immediately after it has passed therethrough, but, on the other hand, takes advantage of the presence of said deflector to also circulate and mix with the hot air already in motion in said internal peripheral chamber. It may be noted that the dimensions of said deflector may remain small enough by comparison with the dimensions of said chamber that the presence of this deflector does not disrupt the flow of deicing air already present in said chamber.

In the air inlet cowl according to the present invention, said air extraction opening may be formed of a single orifice. However, in order to accelerate, within the internal peripheral chamber of the leading edge, the evening-out of the temperature between the pressurized hot air stream being injected into the chamber and the stream of air already circulating therein, and in order not to damage the surrounding structures, it may be advantageous for the extraction opening to be formed of a number of orifices, the sum of the passage cross-sectional areas of which corresponds to the passage cross-sectional area of said single orifice. Thus, firstly, as the stream of hot air passing into the peripheral chamber of the leading edge through the number of air extraction orifices is no longer concentrated at a single point, there is no risk of the zone close to said orifices being damaged by the high temperature of said stream. Secondly, the various jets of air resulting from the presence of the number of extraction orifices mix more quickly with the stream of air already circulating in the chamber and therefore without danger to the surrounding structures.

Moreover, said air extraction opening may either be away from the pressurized hot air feedpipe or may surround the latter. In the latter instance, it may then be in the form of a single annular orifice or of a number of orifices distributed around said pipe.

As described in document U.S. Pat. No. 6,241,189, said protective internal casing may collaborate, in order to delimit said isolation volume enclosing said feedpipe, not only with said first and second internal partitions, but also with the internal face of the external wall of said air inlet cowl. However, because said protective internal casing may have good thermal insulation properties, and be effective enough to thermally protect said surrounding structures, it is possible to reduce the bulk of the protective internal casing, and therefore its mass, by reducing said isolation volume. To do this, the protective internal casing may have a tubular shape delimiting, with said feedpipe, an isolation volume of annular cross section.

Thus, the present invention makes it possible to provide solutions to all the problems encountered in engine air inlet cowls, concerning:

systematic deicing of the leading edge of said cowls even in the event of air leaks from the feedpipe;

resistance to high temperatures; and ease of repair and inspection; specifically, by making the fitting of said casing inside said air inlet cowl removable, the parts of which the heat protection is made can be inspected, as can the surrounding parts (structure and systems).

The figures of the appended drawing will make it easy to understand how the invention may be achieved. In these figures, identical references denote similar elements.

DESCRIPTION OF THE PREFERRED EMBODIMENT(S)

Figure 1:
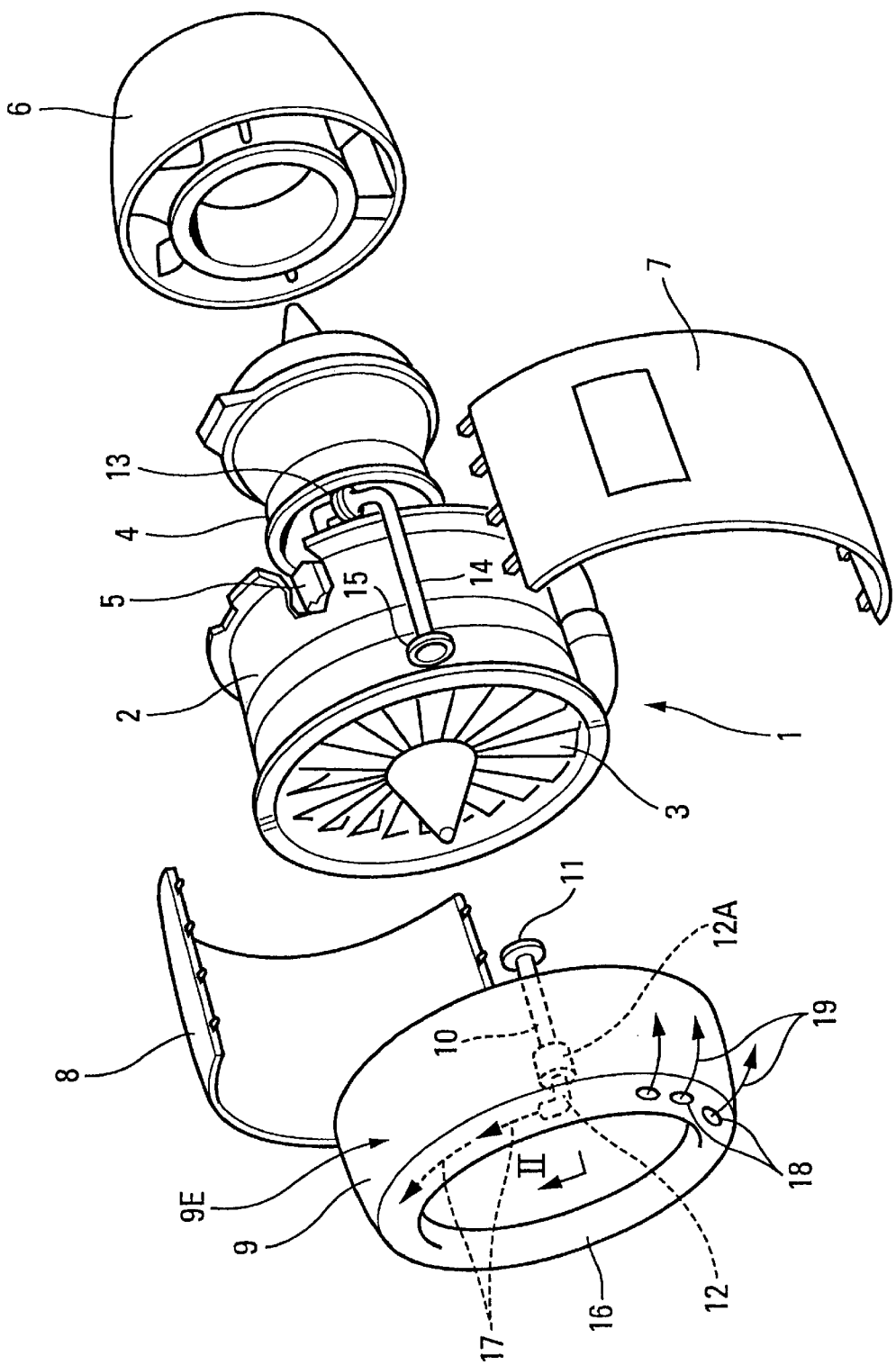
FIG. 1 shows, in exploded perspective, an aircraft jet engine and its various cowlings.

The bypass engine 1 depicted schematically in FIG. 1 comprises, in the known way, a central hot air generator 2, a fan 3 and compressor stages 4, and is provided with an attachment 5 for suspending it from a support pylon (not depicted). Associated with and fixed to the engine 1 are a jetpipe assembly 6, two lateral cowls 7 and 8 and an air intake cowl 9.

As illustrated schematically in FIG. 1, the air inlet cowl 9 comprises a hot air feedpipe 10, provided at its rear end directed toward the engine 1 with a coupling 11 and at its front end lodged in the hollow leading edge of said air inlet cowl with an injector 12 provided with a coupling 12A. Furthermore, arranged on a compressor stage of the engine 1 is a pressurized hot air tapping 13 which is connected to a pipe 14 provided, facing the coupling 11 of the pipe 10, with a complementary coupling 15.

Thus, when the complementary couplings 11 and 15 are coupled, pressurized hot air tapped at 13 off the engine 1 is conveyed through the pipes 14 and 10 as far as the injector 12. The latter can therefore blow this pressurized hot air (dotted arrows 17) inside the leading edge 16 to deice it. Exhaust orifices 18 are provided for evacuating to the open air (arrows 19) the hot air which has circulated inside the leading edge 16.

Figure 2:
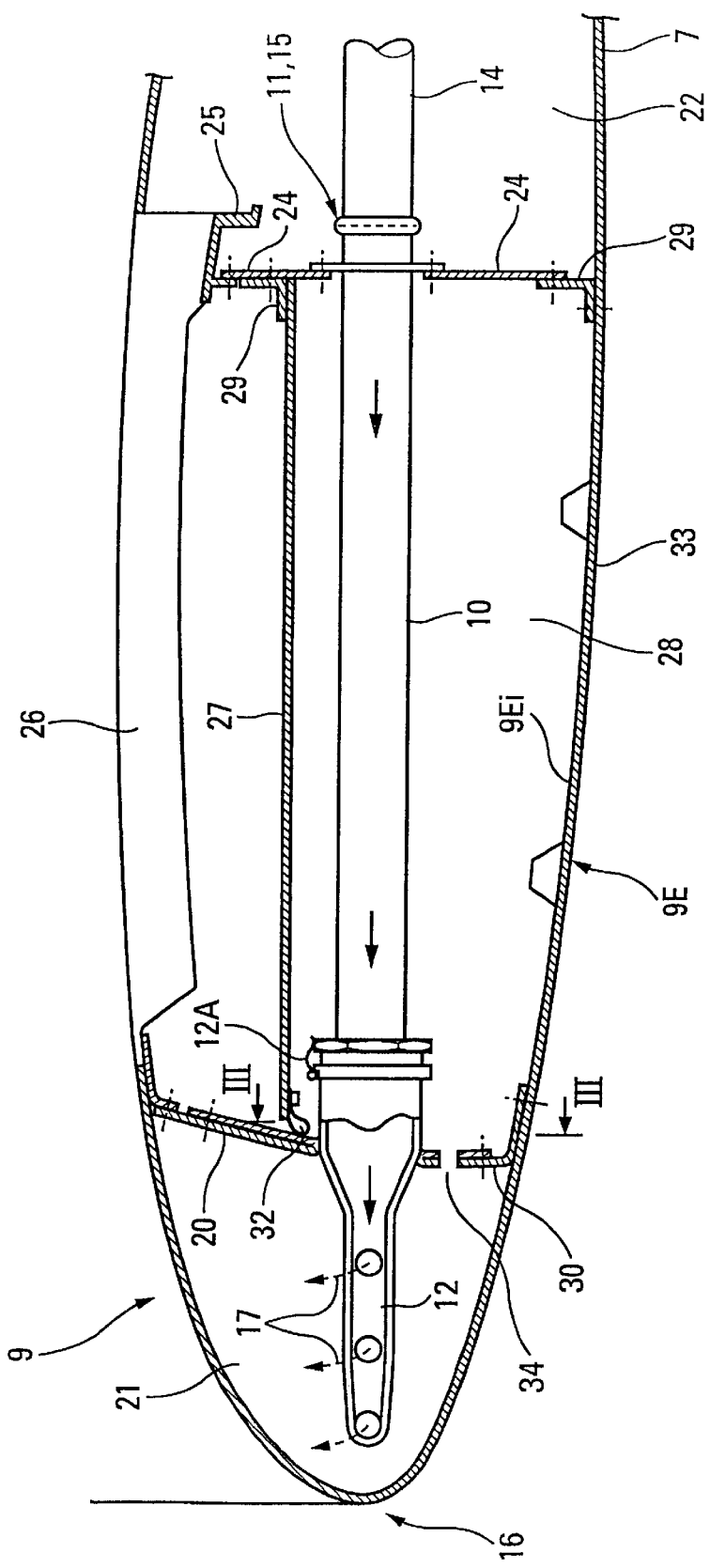
FIG. 2 is an enlarged radial half-section, on arrow II of FIG. 1 of one embodiment of the air inlet cowl of said engine, illustrating the cowl deicing means according to the invention.

As shown in detail and on a larger scale in the radial half section of FIG. 2, the hollow leading edge 16 is closed at the rear end by an internal partition 20 so that an annular peripheral chamber 21 is formed inside said leading edge 16. The injector 12 passes through said internal partition 20 in a sealed manner and is fixed thereto. It may therefore inject pressurized hot air into the chamber 21. The exhaust orifices 18 allow said chamber 21 to be placed in communication with the outside.

When the lateral cowls 7 and 8 are assembled with the central generator 2, they delimit therewith, at the fan 3, a peripheral annular space 22 in which the hot air pipe 14 is located, together with other pipes of this type (not depicted).

Furthermore, the rear end of the pipe 10—the end away from the injector 12—passes through another partition 24 closing the rear end of the cowl 9, near the frame 25 by which said cowl is mounted on the engine 1. This rear end of the pipe 10 is also fixed to said partition 24. Thus, the pipe 10 and the coupling 12A lie between the two partitions 20 and 24, together with other structures such as an acoustic panel 26, for example. Such an acoustic panel 26 is made of composite, for example of the honeycomb type, and is sensitive to heat. It may therefore be destroyed or damaged by the heat radiated by the pipe 10 or by any leaks of pressurized hot air carried by this pipe, or alternatively if said pipe 10 ruptures, by the pressurized hot air escaping therefrom.

Hence, to overcome these drawbacks, a protective internal casing 27 is provided, this collaborating with the partitions 20 and 24 and with the internal face 9EI of the wall 9E of the cowl to delimit an isolation volume 28 enclosing said pipe 10 and the coupling 12A and isolating them from the heat-sensitive structures 26.

Figure 3:
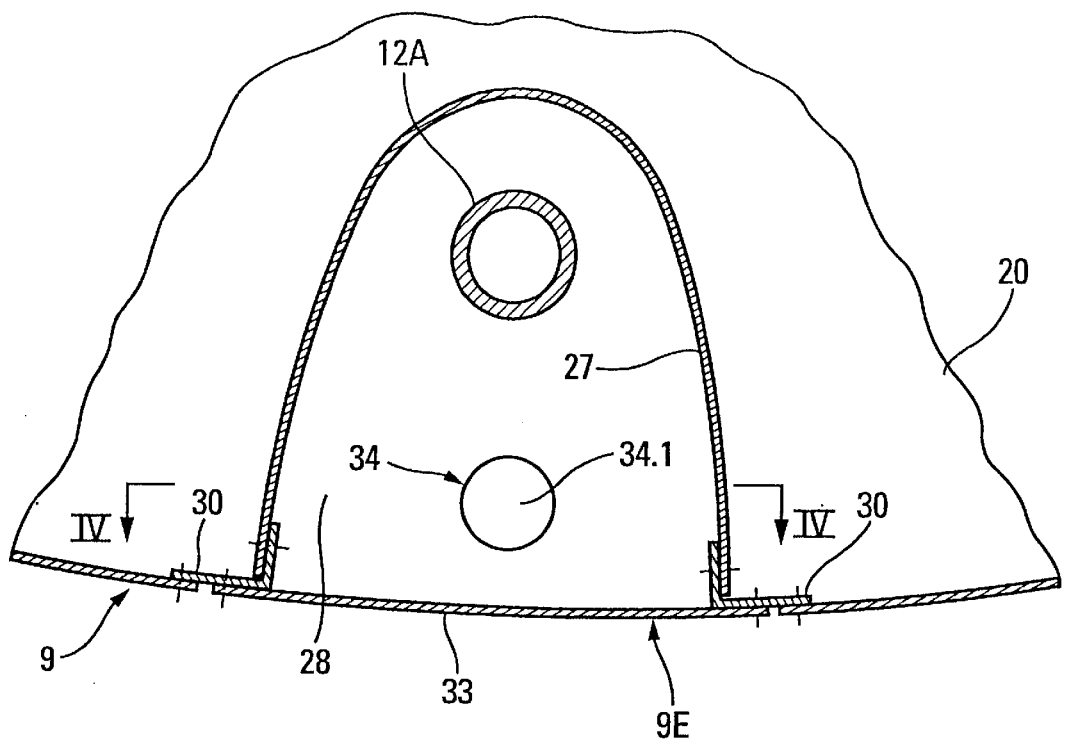
FIG. 3 is a partial and enlarged cross section on III—III of FIG. 2.

In the example depicted in FIGS. 2 and 3, the protective internal casing 27 has the shape of an inverted trough and is fixed removably to the partitions 20 and 24 and to the external wall 9E of the cowl 9. In this example, the protective internal casing 27 is fixed to the partition 24 and to the external wall 9E of the cowl 9 by brackets 29, 30, respectively. In addition, in order to be able to adapt to thermal expansion and to vibrations, the joint between the front edge of the protective internal casing 27 and the partition 20 is via an elastic bearing seal 32.

In order to improve the removability of the protective internal casing, it is advantageous for the part of the external wall 9E to which it is fixed to consist of a panel 33 which can itself be removed.

Figure 4:
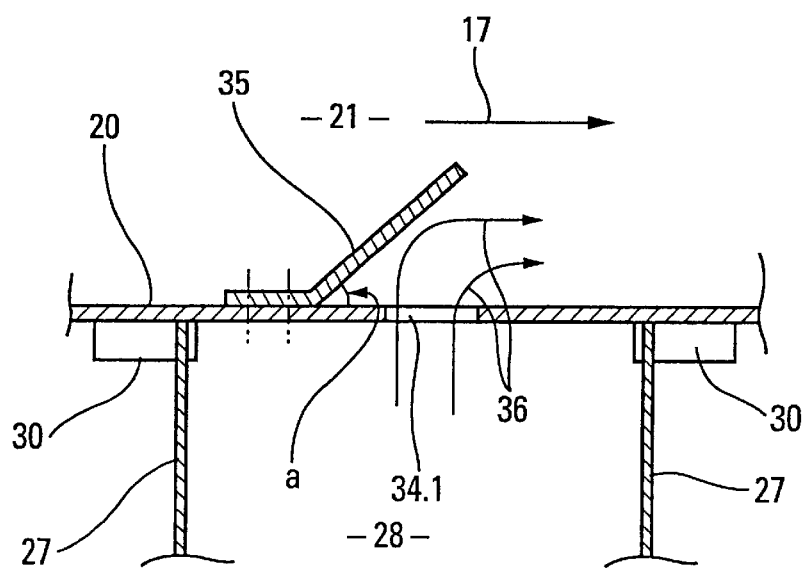
FIG. 4 is a partial and enlarged cross section on IV—IV of FIG. 3.

Furthermore, the isolation volume 28 enclosing the pipe 10 and the coupling 12A is in communication with said peripheral chamber 21 via an air extraction opening 34 formed, in the example of FIGS. 3 and 4, of one single orifice 34.1 made in the partition 20. The passage cross-sectional area of said air extraction opening 34 is chosen, on the one hand, from a range of values such that the over-pressure of pressurized hot air in said isolation volume 28, which would result from any damage to said pipe 10, is not damaging to said protective internal casing 27. On the other hand, said area is chosen, from said range of values, to give the injector 12, in the event of damage to said pipe 10, a pressurized hot air flow rate at least equal to 50% of the pressurized hot air flow rate in said pipe 10. This is easily obtained by contriving that, for the pressurized hot air in the broken pipe 10 and in the isolation volume 28, the path through the opening 34 has resistance to flow at least equal to, but preferably greater than, that of the path through the injector 12. It can also be seen that the isolation volume 28 enclosing said pipe 10 is entirely closed, except for the communication with said internal peripheral chamber 21 of the leading edge 16, which communication is established through the extraction opening 34.

Thus, in normal operation (see FIG. 2), as the protective casing 27 has good thermal properties, it is effective enough by itself to protect said surrounding structures from the thermal radiation of the pipe 10. Should the pipe 10 burst, the pressurized hot air spreads out into the isolation volume 28 and passes into the annular peripheral chamber 21 of the leading edge 16 through the orifice 34.1 (see arrows 36 in FIG. 4). Because of the special calibration, according to the present invention, of said extraction orifice 34.1, the over-pressure resulting from the bursting of said pipe cannot damage the walls of said isolation volume 28. In addition, the pressure therein increases to become at most equal to the hot air pressure in said pipe 10. The result of this is that, at the leaking zone of the pipe 10, the pressure in said isolation volume 28 acts like an imaginary bung virtually plugging said leaking zone and confining the pressurized hot air, tapped off the engine 1, in the pipe 10. Said hot air therefore continues, at least in part, to feed the injector 12. In consequence, in the peripheral chamber 21 of the leading edge 16, the injector injects a stream of pressurized hot air which starts to circulate through this chamber and, at each moment, the stream of pressurized hot air being injected mixes with the stream of air already circulating therein. Thus, the temperature of the air stream in said peripheral chamber 21 can be evened out and satisfactory deicing of the leading edge 16 of the air inlet cowl 9 can be obtained even in the parts of the cowl 9 distant from said injector. The hot air which has circulated through said peripheral chamber 21 of the leading edge 16 and has cooled upon contact with the walls thereof is then removed to the open air through said exhaust orifices 18 with which said leading edge 16 is provided.

As is illustrated in FIG. 4, a deflector leaf 35 may be fixed to the internal partition 20, inside the internal peripheral chamber 21 of the leading edge 16 in close proximity to and facing the extraction orifice 34.1 so as to deflect, in the sense and direction of the air already circulating through said chamber 21 (arrows 17), the air passing through said orifice 34.1 (arrows 36). Said leaf 35 makes an acute angle a with the partition 20, which angle is large enough not to obstruct the extraction orifice 34.1 and not to impede the air stream passing through said orifice. As said angle a is acute and as the dimensions of said leaf 35 are small by comparison with the dimensions of the internal peripheral chamber 21, the leaf 35 does not disturb the flow of the deicing hot air already circulating in said chamber 21. Thus, the air passing through the extraction orifice 34.1 does not expand immediately after it has passed therethrough, but, on the contrary, benefits from the presence of said leaf 35 to circulate in the sense of the arrows 17 and mix with the air already circulating in the chamber 21.

Figure 5:
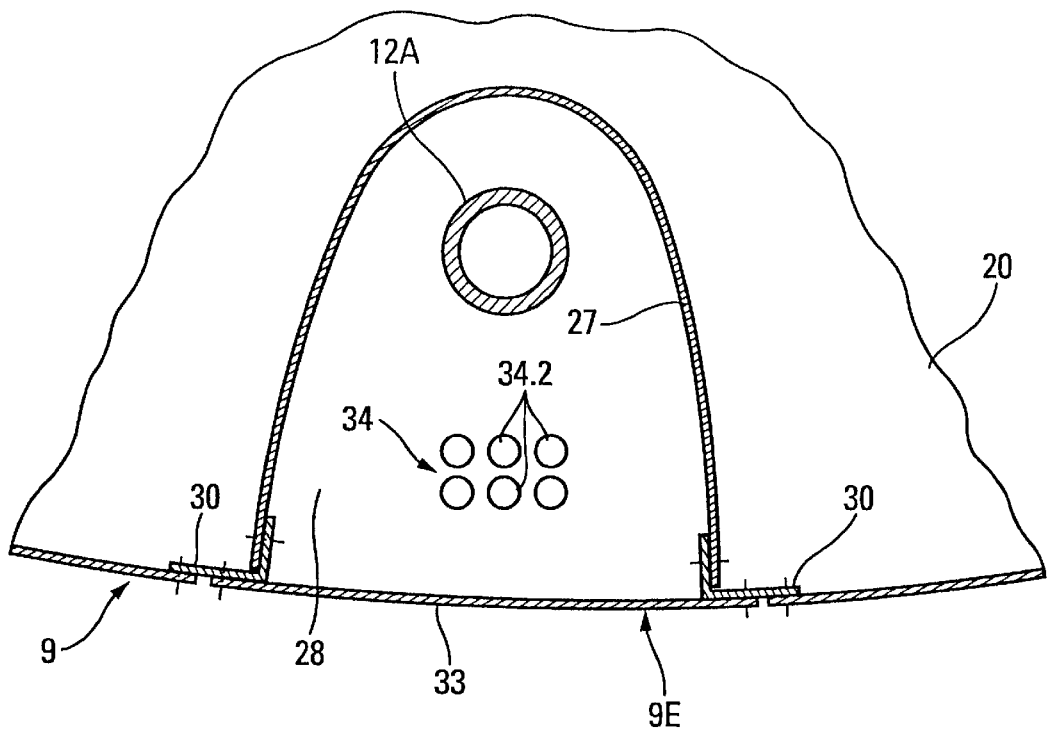
FIG. 5 shows, in a view similar to FIG. 3, an alternative form of embodiment of the invention regarding said extraction opening.

FIG. 5 depicts an alternative form of embodiment of the invention. In this alternative form, the extraction opening 34, instead of consisting of a single orifice 34.1 (as depicted in FIGS. 3 and 4) is formed of a number of air extraction orifices 34.2 the sum of the passage cross-sectional areas of which is chosen from the range of values which, on the one hand, avoids overpressure of pressurized hot air in the isolation volume 28 resulting from possible damage to the pipe 10 being detrimental to the protective casing 27 and, on the other hand, gives the injector 12, in the event of damage to the pipe 10, a pressurized hot air flow rate at least equal to 50% of the hot air flow rate in said pipe 10. Thus, in the event of damage of said pipe 10, the pressurized hot air spreads out in said isolation volume 28 and passes, in the form of isolated jets, into said peripheral chamber 21 of the leading edge 16 through the number of air extraction orifices 34.2. The various air jets resulting from the presence of the number of said orifices 34.2 mix more quickly with the stream of air already circulating in the internal peripheral chamber 21 of the leading edge 16 and therefore run no risk of damaging the surrounding structures 26.

Figure 6:
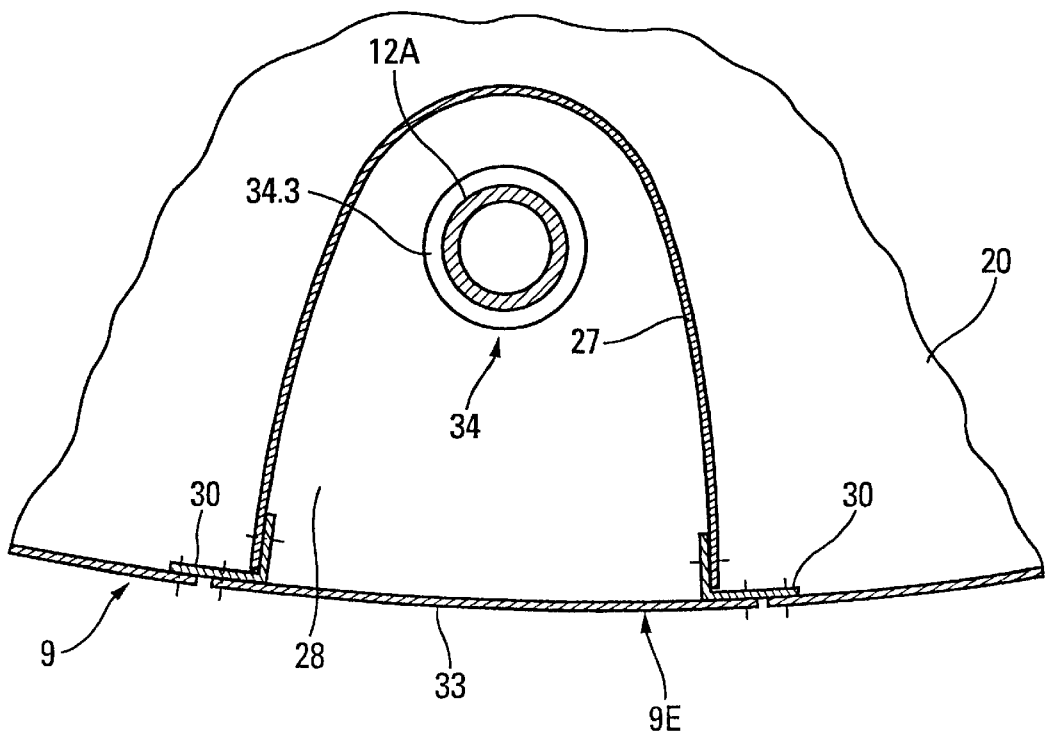
FIG. 6 shows, in a view similar to FIG. 3, another alternative form of embodiment of said extraction opening.

FIG. 6 depicts another alternative form of embodiment of the invention. In this alternative form, the extraction opening 34 is formed of an annular orifice 34.3 surrounding the pipe 10 and/or the coupling 12A.

Figure 7:
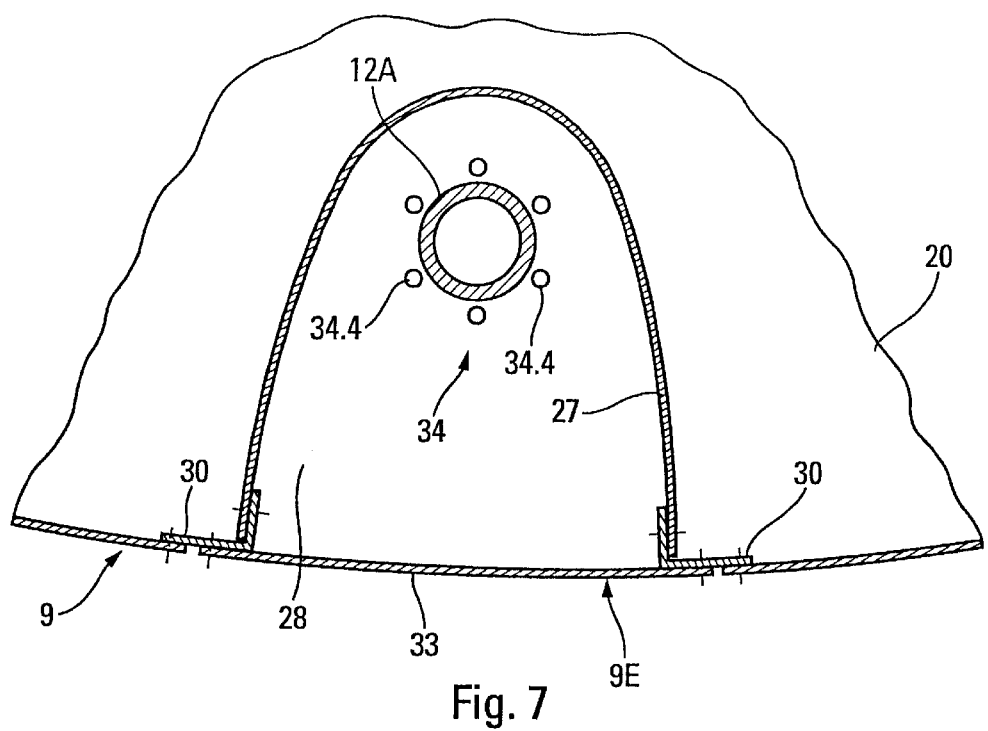
FIG. 7 shows, in a view similar to FIG. 3, yet another alternative form of embodiment of said extraction opening.

In FIG. 7, in another alternative form of embodiment, the extraction opening 34 is made up of a number of orifices 34.4 distributed around said pipe 10 and/or the coupling 12A.

Figure 8:
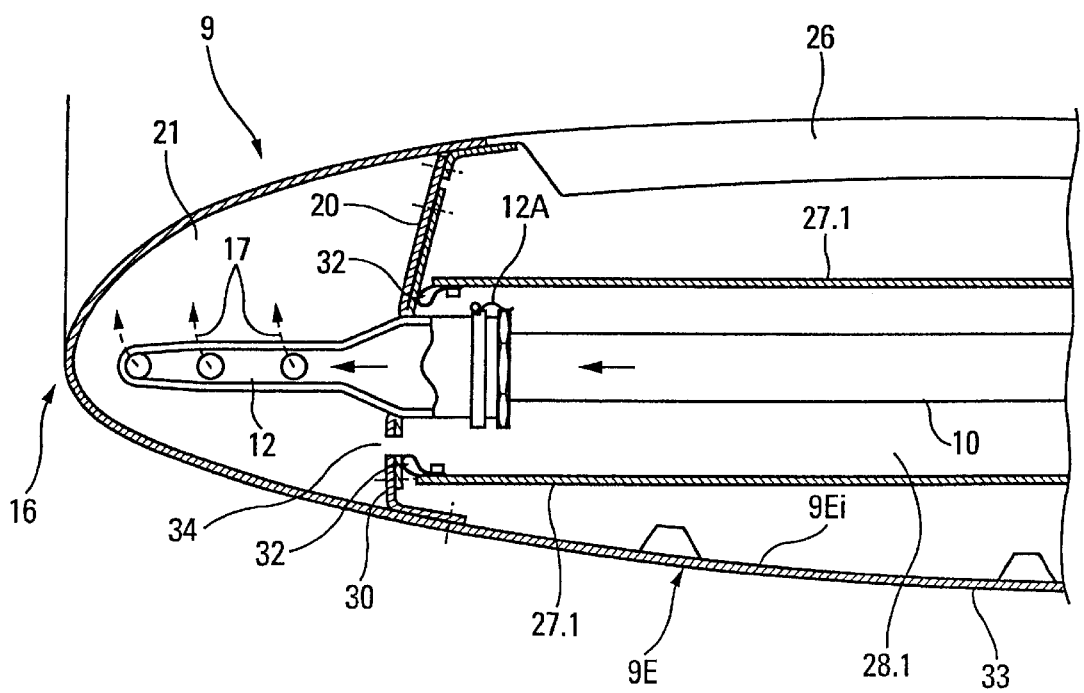
FIG. 8 is a view similar to FIG. 2 illustrating an alternative form of embodiment of said protective internal casing.

FIG. 8 depicts yet another embodiment of the invention. In this embodiment, the protective internal casing 27.1 is tubular and no longer collaborates with the internal face 9EI of the external wall 9E of the cowl (as the internal casing 27 described hereinabove did) to enclose the pressurized hot air feedpipe 10 and the coupling 12A, isolating them from the heat-sensitive structures 26. Said tubular protective internal casing 27.1 delimits an isolation volume 28.1 of annular cross section around the pipe 10. It may be connected to the internal partition 20 by the seal 32. This last embodiment makes it possible to reduce the isolation volume 28.1 by reducing the bulk of the protective internal casing 27.1 in the air inlet cowl 9 and thus to reduce the mass of the protective device.

What is claimed is:

1. An air inlet cowl for a jet engine, particularly an aeroengine, said air inlet cowl being provided with means for deicing its leading edge, and comprising:
   a hollow leading edge delimiting an internal peripheral chamber, closed by a first internal partition;
   at least one exhaust orifice placing said internal chamber in communication with the outside and made in said hollow leading edge;
   a pressurized hot air feedpipe capable of being connected, at its rear end away from said leading edge and passing through a second internal partition, to a pressurized hot air circuit and, at its front end toward said leading edge, to an injector injecting said pressurized hot air into said internal chamber of the leading edge;
   a protective internal casing collaborating with said first and second internal partitions to delimit an isolation volume enclosing said feedpipe; and
   an air extraction opening made in said first partition to place said isolation volume enclosing said feedpipe in communication with said internal peripheral chamber of said leading edge, the area of this extraction opening being chosen from a range of values such that, in the event of damage to said hot air feedpipe:
      the elimination of pressurized hot air in said isolation volume is not detrimental to said protective internal casing; and
      the injector injects into said internal chamber a pressurized hot air flow rate at least equal to 50% of the hot air flow rate in said feedpipe.

2. The air inlet cowl as claimed in claim 1,
which comprises, inside said internal peripheral chamber of the leading edge, a deflector capable of deflecting the hot air passing through said air extraction opening in the same direction as the hot air injected by said injector.

3. The air inlet cowl as claimed in claim 1,
wherein said air extraction opening is formed of a single orifice.

4. The air inlet cowl as claimed in claim 1,
wherein said air extraction opening is formed of a number of orifices.

5. The air inlet cowl as claimed in claim 1,
wherein said air extraction opening is away from said feedpipe.

6. The air inlet cowl as claimed in claim 1,
wherein said air extraction opening surrounds said feedpipe.

7. The air inlet cowl as claimed in claim 1,
wherein said protective internal casing collaborates in addition with the internal face of the external wall of said cowl to delimit said isolation volume enclosing said feedpipe.

8. The air inlet cowl as claimed in claim 1,
wherein said protective internal casing delimits, with said feedpipe, an isolation volume of annular cross section.

* * * * *